H. A. LACERDA.
STAY BOLT FOR BOILERS.
APPLICATION FILED JAN. 24, 1917.
1,304,889. Patented May 27, 1919.
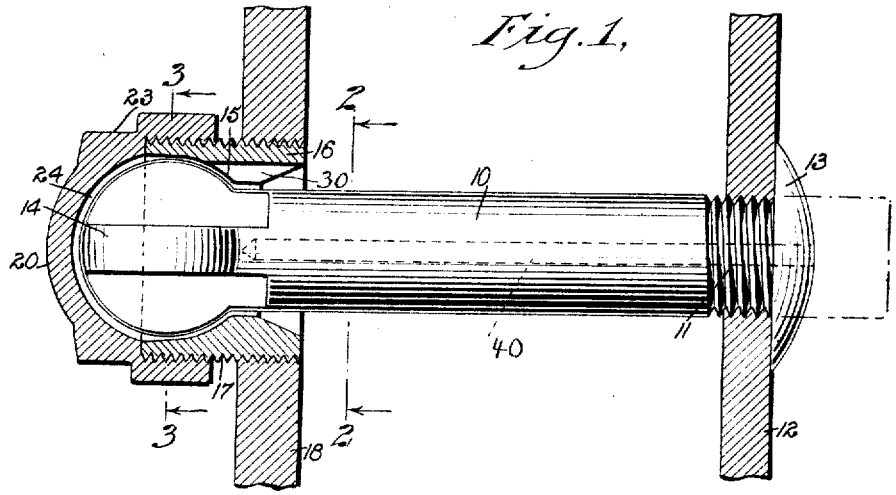
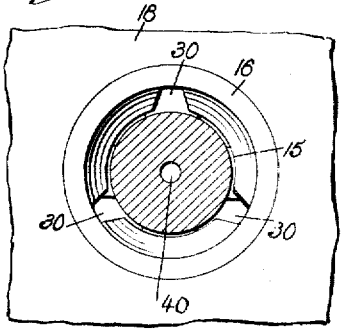
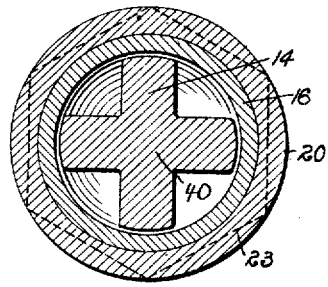
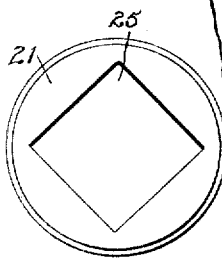
WITNESSES
Edw. Thorpe
Geo. J. Howard
INVENTOR
Harry A Lacerda
BY Munn & Co
ATTORNEYS

UNITED STATES PATENT OFFICE.

HARRY A. LACERDA, OF SCHENECTADY, NEW YORK, ASSIGNOR TO R. B. G. HAUGHTON, OF PITTSBURGH, PENNSYLVANIA.

STAY-BOLT FOR BOILERS.

1,304,889.  Specification of Letters Patent.  Patented May 27, 1919.

Application filed January 24, 1917. Serial No. 144,210.

*To all whom it may concern:*

Be it known that I, HARRY A. LACERDA, a citizen of the United States, and a resident of Schenectady, in the county of Schenectady and State of New York, have invented a new and Improved Stay-Bolt for Boilers, of which the following is a full, clear, and exact description.

The invention relates to stay bolts having a ball and socket joint connection between the head of the bolt and the plug or sleeve screwing into the outer boiler sheet.

The object of the present invention is to provide a new and improved stay bolt for boilers arranged to compensate for expansion and contraction of the boiler sheets to insure a free flexing action of the stay bolt at all times by keeping the ball and socket joint free of any scale or other extraneous matter. Another object is to permit of conveniently screwing the bolt into the inner boiler sheet and screwing the plug or sleeve into the outer boiler sheet.

In order to accomplish the desired result, use is made of a bolt and a plug, the bolt and plug having a ball and socket joint connection and the said ball and socket joint forming a circulating passage for water or steam to keep the ball and socket joint free of extraneous matter and in clean, active condition.

A practical embodiment of the invention is represented in the accompanying drawings forming a part of this specification, in which similar characters of reference indicate corresponding parts in all the views.

Figure 1 is a sectional side elevation of the stay bolt as applied and showing the bolt proper in elevation;

Fig. 2 is a cross section of the same on the line 2—2 of Fig. 1;

Fig. 3 is a similar view of the same on the line 3—3 of Fig. 1;

Fig. 4 is a sectional side elevation of a modified form of the stay bolt with the bolt proper shown in elevation;

Fig. 5 is a cross section of the same on the line 5—5 of Fig. 4; and

Fig. 6 is a face view of the cap shown in Fig. 4.

The bolt 10 is provided at its inner end with screw threads 11 screwing into the inner boiler sheet 12, and a head 13 is formed after the bolt is screwed in place to prevent unscrewing of the bolt. The outer end of the bolt 10 is provided with a head formed of radial projections 14, which form a head which is cruciform in cross section. The exterior surfaces of these projections are spherical and are seated on a spherical seat 15 formed interiorly on a plug or a sleeve 16 provided with an exterior thread 17 screwing into the outer boiler sheet 18. The plug 16 is closed by a cap 20 or 21, of which the cap 20 is screwed on the outer end of the exterior screw thread 17 while the cap 21 (see Fig. 4) is screwed onto an interior screw thread 22 formed on the inside of the plug 17. It is understood that the cap 20 is used in case the outer end of the plug 16 extends beyond the face of the boiler sheet 18, and in this case the cap 20 is provided with an exterior polygonal portion 23 for engagement by a wrench or other tool to screw the cap in place. The inner surface of the cap 20 is provided with a spherical recess 24 concentric to the spherical shape of the head 14 to form a passage with the same and thus allow water or steam to pass around the head 14 with a view to prevent scale or other extraneous matter from lodging between the head and the cap 20 or in the joint between the head 14 and the socket 15. The cap 21 is used in case the outer face of the plug 17 is flush with the outer face of the boiler sheet 18, as plainly shown in Fig. 4, and in this case the outer face of the cap 21 is provided with a polygonal recess 25 for the application of a suitable tool to screw the cap 21 into position in the plug 17 or to unscrew it therefrom whenever an inspection is to be made. The socket 15 is provided with a plurality of notches or grooves 30 which form passages for the water or steam to the joint between the head 14 and the socket 15, and the said notches are adapted to be engaged by a suitably constructed tool for conveniently screwing the plug 16 into position in the outer boiler sheet 18 without danger of injuring the socket 15.

From the foregoing it will be seen that by the arrangement described, the bolt 10 can be readily screwed into the inner boiler sheet 12 by applying a suitable tool to the head 14 and turning such tool by a motor or other means thus completely avoiding any injury to the threaded aperture in the sheet 18 into which the plug 16 is screwed.

The provision of an opening between the spherical head of the bolt and the socket member is not only important in permitting the circulation of water and steam to keep the ball and socket joint free of extraneous matter and in a clean active condition, but it also has another highly important function in that it enables the workmen to readily see that the head of each bolt is perfectly seated on the sleeve member when the bolt is put in place. This has not heretofore been possible with any bolt of this type, since the spherical head necessarily prevented any inspection of the character of its seating. It has frequently been found that a considerable percentage of stay bolts are not properly seated in the first instance and are therefore useless, the strain being thrown on adjacent bolts. By my construction, and especially with a spherical head of the cruciform shape shown, opportunity is given to accurately determine the initial seating of each bolt head before the cap is screwed on. The form of the head may, however, be widely changed and still provide the necessary inspection opening or openings.

It will further be seen that the plug 16 can be readily screwed in place without injury to the threads 17 or the socket 15. When the several parts are in place a circulating passage is formed between the bolt head 14 and the cap 20 and likewise with the joint socket 15 to prevent lodging of any scale or extraneous matter between the spherical face of the head 14, the cap 20 or 21 and the socket 15 thus keeping the stay bolt at all times in proper flexible condition without danger of breaking such stay bolt in case its head should be prevented from turning in the socket on account of hardened scale or the like. By keeping the contacting faces of the socket 15 and the head 14 in proper condition the stay bolt readily compensates for expansion and contraction of the boiler sheets 12 and 13.

The bolt 10 is provided with a tell-tale opening 40 extending through the major portion of the length of the bolt, but terminating short of the end surface of the spherical head, and hence in case the bolt should break for any reason whatever water or steam can flow out at the inner end thus calling attention to the defect and without requiring the usual periodical removal of the cap 20 or 21 at the outer end of the bolt 10.

Having thus described my invention, I claim as new and desire to secure by Letters Patent:—

1. A stay bolt for boilers and like structures, comprising a bolt and a socket member, the said bolt and socket member having a ball and socket joint connection, one of said members having a circulating passage for water or steam to keep the ball and socket joint free of extraneous matter and in clean active condition.

2. A stay bolt for boilers and like structures, comprising a bolt adapted to be held at one end in one boiler sheet, a sleeve adapted to engage the other boiler sheet, the other end of the said bolt and the said sleeve forming a ball and socket joint with each other one of said members having an opening forming a circulating passage for the water or steam in the boiler to keep the ball and socket joint free of extraneous matter and in clean active condition.

3. A stay bolt for boilers and like structures, comprising a bolt adapted to be held at one end in one of the boiler sheets and provided at the other end with a head, and a plug screwing in the other boiler sheet and having a socket engaged by the said head, the said socket and the said head having passages for the circulation of water and steam.

4. A stay bolt for boilers and like structures, comprising a bolt adapted to be held at one end in one of the boiler sheets and provided at the other end with a head, a plug screwing in the other boiler sheet and having a socket engaged by the said head, the said socket and the said head having passages for the circulation of water and steam, and a cap screwing on the said plug and forming with the said head a passage in communication with the passages of the head.

5. A stay bolt for boilers and like structures, comprising a bolt adapted to be held at one end in one of the boiler sheets, the bolt having at its other end a spherical head provided with passages, and a plug adapted to screw in the other boiler sheet, the plug having an interior spherical socket on which the said head is seated, the socket having passages, the passages in the bolt head and plug coöperating to form means for circulation of water and steam to thereby keep the ball and socket joint free of extraneous matter and in clean, active condition.

6. A stay bolt for boilers and like structures, comprising a bolt and a socket member, the said bolt and socket member having a ball and socket joint connection, and one of said members having a circulating passage for water or steam to keep the ball and socket joint free of extraneous matter and in clean active condition, the bolt having a telltale opening extending throughout the major portion of its length.

7. A stay bolt for boilers and like structures, comprising a plug having a spherical interior socket and adapted to screw into one boiler sheet, and a bolt adapted to be fastened at one end to the other boiler sheet, the bolt having a head cruciform in cross section with the exterior surface of spherical shape and seated on the said socket.

8. A stay bolt for boilers and like structures provided with a bolt threaded at one end to screw into a boiler sheet, the bolt having a head cruciform in cross section adapted to be engaged by a correspondingly shaped tool to turn the bolt and screw the same into the boiler sheet.

9. In a stay bolt for boilers and like structures, a tubular plug threaded exteriorly to screw into a boiler sheet, the plug having an internal socket provided with passages for engagement by a tool to screw the plug into the boiler sheet.

10. In a stay bolt for boilers and like structures, a plug provided with an exterior and an interior screw thread and having an interior socket, a bolt having a spherical head cruciform in cross section and seated on the said socket, and a cap screwing in the said plug and having a polygonal recess for the application of a tool to screw the cap in place in the plug.

11. A stay bolt for boilers and like structures, having a threaded portion at one end adapted to screw into a boiler sheet, the other end of the bolt having a radial projection which is provided with a spherical surface to form a seat engaging portion for the head, said projection being shaped to be engaged by a correspondingly shaped tool to turn the bolt and screw the same into the boiler sheet; substantially as described.

12. A stay bolt for boilers and like structures, comprising a bolt and a socket member, the said bolt and socket member having a ball and socket joint connection, there being an opening between the head portion of the bolt member and the socket member through which the seating of the bolt may be seen, and said socket member having a removable cap portion giving access to said opening.

13. A stay bolt for boilers and like structures, comprising a bolt member and a socket member, the two members having a ball and socket joint connection, and the bolt head having a plurality of cut away portions which intersect the bearing surface of the joint, and which provide a plurality of openings through which the seating of the bolt may be inspected, said socket member having a removable cap portion giving access to said cut away portions.

14. A stay bolt for boilers and like structures having a threaded portion at one end adapted to screw into a boiler sheet, the bolt having a head at the other end formed of a plurality of radial projections having angular side walls and spherical surfaces to form seat engaging portions for the head, said angular side walls being adapted to be engaged by correspondingly shaped tools to turn the bolt and screw the same into the boiler sheet.

HARRY A. LACERDA.